(12) United States Patent
Sakaguchi (10) Patent No.: US 6,407,378 B1
(45) Date of Patent: Jun. 18, 2002

(54) OPTICAL ENCODER DEVICE USING A PLURALITY OF LIGHT RECEIVING AND EMITTING MEANS WITH THE LIGHT EMITTING MEANS HAVING A LENS FOR EMITTING LIGHT IN SUBSTANTIALLY PARALLEL BEAMS

(75) Inventor: Takahiro Sakaguchi, Kokubunji (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/447,774

(22) Filed: Nov. 23, 1999

(30) Foreign Application Priority Data

Jan. 12, 1999 (JP) ............................................. 11-005575

(51) Int. Cl.⁷ ................................................. G01D 5/34
(52) U.S. Cl. .............................. 250/231.13; 360/77.03; 250/231.16
(58) Field of Search ....................... 250/231.13–231.18, 250/232, 233, 237 G; 356/615–622; 360/77.03, 78.11; 369/44.11, 44.14

(56) References Cited

U.S. PATENT DOCUMENTS

| 5,179,485 A | * | 1/1993 | Tamayama | ............... 360/78.11 |
| 5,528,227 A | * | 6/1996 | Eguchi | ........................ 340/671 |
| 5,763,874 A | * | 6/1998 | Luciano et al. | ........ 250/231.14 |

FOREIGN PATENT DOCUMENTS

| GB | 2 067 747 A | 7/1981 |
| GB | 2 298 482 A | 9/1996 |
| JP | 5-87590 | 4/1993 |

* cited by examiner

Primary Examiner—Que T. Le
Assistant Examiner—Thanh X. Luu
(74) Attorney, Agent, or Firm—Anderson Kill & Olick; Eugene Lieberstein; Michael N. Meller

(57) ABSTRACT

An encoder device has a main scale with a plurality of slit-like openings at regular intervals, light-emitting means for emitting and directing light toward the main scale, light-receiving means including four light receiving members for receiving light emitted from the light-emitting means via the slit-like openings in the main scale, and means for obtaining information concerning displacement of the main scale by using output signals output from the light-receiving means. The first and the second light-receiving members are disposed with respect to the slit-like openings of the main scale so as to have substantially the same phase, and the third and the fourth light-receiving members are disposed with respect to the slit-like openings of the main scale so that a first differential output signal, obtained by differentially amplifying an output signal output from the first light-receiving member and an output signal output from the third light-receiving member, and a second differential output signal, obtained by differentially amplifying an output signal output from the second light-receiving member and an output signal output from the fourth light-receiving member, have the same period and a predetermined phase difference. The first and second light-receiving members can be spaced further apart and the effects of light leaked when a given opening is between the first and second light-receiving members can be eliminated, making it possible to bring the light-emitting member and the light-receiving members closer together and thus make the encoder device slimmer.

6 Claims, 11 Drawing Sheets

FIG.10D (A, B PHASES STAGGERED BY ±δ)

FIG.12A

FIG.12B  DIFFERENTIAL SIGNAL

FIG.12C

FIG.12D  DEFFERENTIAL SIGNAL

FIG.13

OPTICAL ENCODER DEVICE USING A PLURALITY OF LIGHT RECEIVING AND EMITTING MEANS WITH THE LIGHT EMITTING MEANS HAVING A LENS FOR EMITTING LIGHT IN SUBSTANTIALLY PARALLEL BEAMS

BACKGROUND OF THE INVENTION

1. Field of the Invention

The present invention relates generally to an encoder device, and more particularly, to an optical encoder device that is thinner and at the same time provides highly accurate encoder output.

2. Description of the Related Art

In a magnetic disk drive, for example, a head carriage having a magnetic head is moved in a radial direction of a disk and the magnetic head is made to trace a selected track as the position of the head carriage is detected by the encoder device. Efforts are underway to make encoder devices of this type thinner and more compact while at the same time providing highly accurate encoder output.

The conventional encoder device has two light-receiving elements such as photodiodes placed 90 degrees apart, with two signals phase A and phase B having the same periods being output from light-receiving elements that receive the light from the light-emitting elements. From the two signals phase A and phase B the direction and distance that the head carriage has traveled is obtained.

More recently, in an effort to obtain more accurate encoder device output, four light-receiving elements have come to be used and four signals phase A, phase B, inverted phase A and inverted phase B extracted and the phase A and inverted phase A, as well as the phase and the inverted phase B, are differentially amplified.

Figure 1:
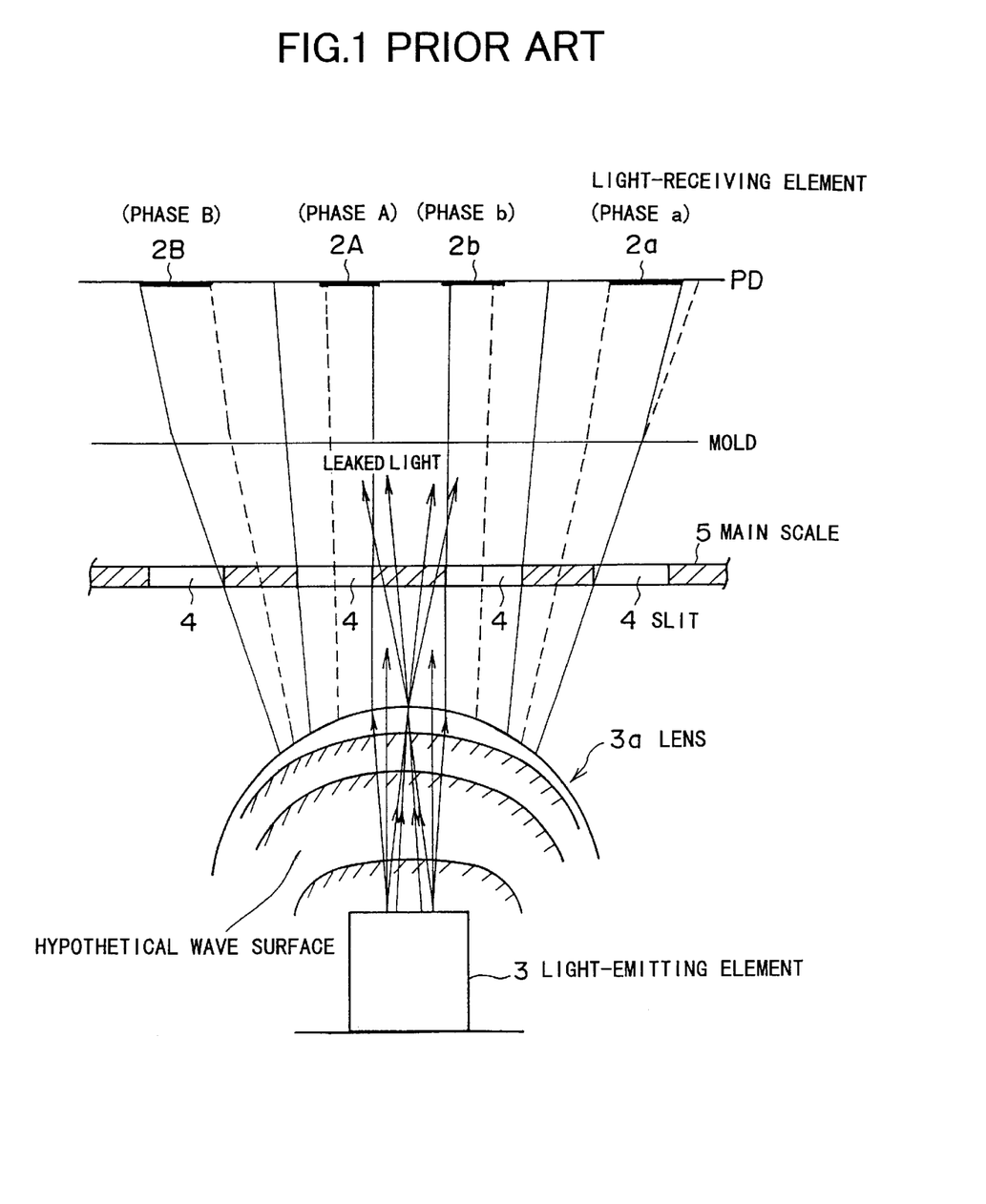
FIG. 1 is a schematic structural diagram of a conventional encoder device.

FIG. 1 is a schematic structural diagram of a conventional encoder device. As indicated in the diagram, in the conventional encoder device 1 the light-receiving element 2A and the light-receiving element 2B are disposed so as to have phases 90 degrees different from each other, the light-receiving element 2a of the inverted phase A and the light-receiving element 2A are disposed so as to have phases 180 degrees different from each other and the light-receiving element 2b of the inverted phase B and the light-receiving element 2B are disposed so as to have phases 180 degrees different from each other.

Additionally, in the conventional encoder device 1 a light-emitting element 3 is disposed at a location opposite the light-receiving elements 2A, 2B, 2a and 2b, the light-receiving elements 2A, 2B, 2a and 2b symmetrically disposed with respect to a center line of the light-emitting element 3. A main scale 5 made of a single piece of plastic is provided between a lens 3a of the light-emitting element 3 and the light-receiving elements 2A, 2B, 2a and 2b. The main scale 5 has slits 4 spaced at regular intervals, the slits 4 being shown in FIG. 1 as blank openings in the main scale 5.

Light emitted from the light-emitting element 3 is diffused at predetermined angles by the lens 3a so as to reach the light-receiving elements 2A, 2B, 2a and 2b. When the main scale 5, which is movable, moves in a direction D with respect to the light-emitting element 3, the light emitted from the light-emitting element 3 passes through the slits 4 in the main scale 5 and strikes the light-receiving elements 2A, 2B, 2a and 2b. The intensity of the light received at each of the light-receiving elements 2A, 2B, 2a and 2b varies as the main scale 5 moves and its position changes with respect to the light-receiving elements 2A, 2B, 2a and 2b.

As a result, a waveform signal is obtained from each of the light-receiving elements 2A, 2B, 2a and 2b which corresponds to variations in the level of light received at the light-receiving elements 2A, 2B, 2a and 2b as the main scale 5 changes position with respect to the light-receiving elements 2A, 2B, 2a and 2b. Signals from the light-receiving elements 2A, 2B, 2a and 2b are input into a circuit not shown in the diagram, so that a phase A signal output from the light-receiving element 2A and a phase a signal output from the light-receiving element 2a are differentially amplified to obtain an A' phase signal (=A−a) and, similarly, a phase B signal output from the light-receiving element 2B and a phase b signal output from the light-receiving element 2b are differentially amplified to obtain a B' phase signal (=B−b). The A' phase signal and the B' phase signal have phases 90 degrees different from each other.

The arrangement of the light-receiving elements 2A, 2B, 2a and 2b is not important so long as phase A signals and phase B signals having phases 90 degrees different from each other and having the same period are output from the encoder device.

Figure 2:
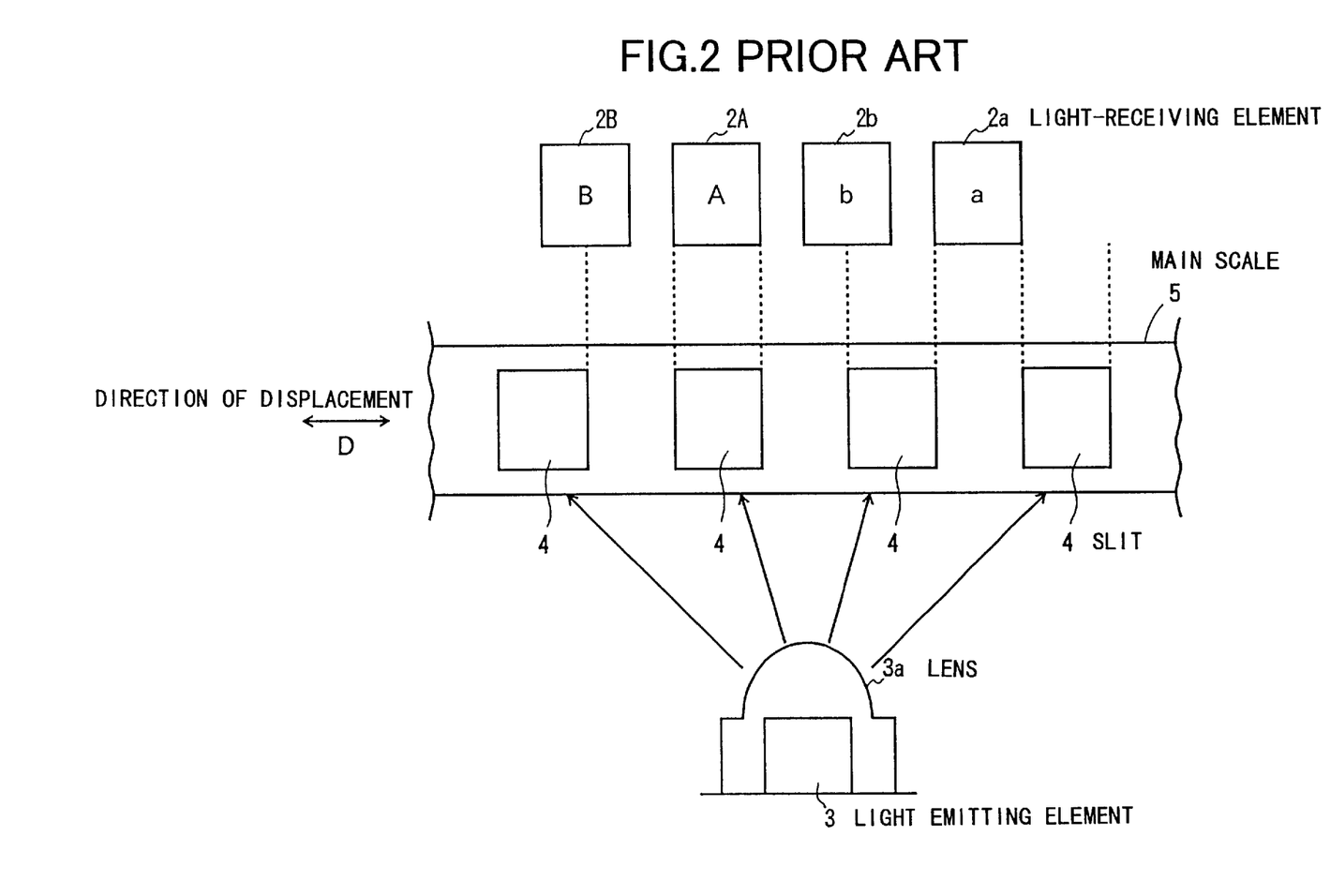
FIG. 2 is a diagram showing the conventional arrangement of the light-receiving elements 2A, 2B, 2a and 2b.

FIG. 2 is a diagram showing the conventional arrangement of the light-receiving elements 2A, 2B, 2a and 2b. As shown in the diagram, light-receiving element 2B is positioned to one side of light-receiving element 2A so as to have a phase 90 degrees different from that of light-receiving element 2A, and light-receiving element 2a is positioned to one side of light-receiving element 2b so as to have a phase 90 degrees different from that of light-receiving element 2b.

By positioning light-receiving elements 2A, 2B, 2a and 2b as described above, the light-receiving elements 2A, 2B, 2a and 2b are spaced an equal distance apart, that is, are spaced so as have a phase difference of 90 degrees. With such an arrangement of the light-receiving elements 2A, 2B, 2a and 2b, interference between the light-receiving elements 2A, 2B, 2a and 2b can be reduced and the sensitivity of the light-receiving elements 2A, 2B, 2a and 2b can be improved.

However, in the conventional encoder device 1 having the structure described above, when a given slit 4 of the main scale 5 passes a position opposite a central portion of the lens 3a of the light-emitting element 3, the light emitted from the light-emitting element 3 via the lens 3a is not in the form of parallel beams of light but is dispersed at predetermined angles and, at the same time, diffracted by the edges of the slits 4, and thus light leaks from the slits 4. As a result, the light-receiving elements 2A and 2b, which are positioned near the central portion of the lens 3a, are affected by the above-described leaked light and the detectional accuracy of the light-receiving elements 2A and 2b is degraded.

Moreover, although it is desirable to make the encoder device slimmer, the effect of the above-described leaked light only increases as the light-receiving elements 2A, 2B, 2a and 2b are positioned closer to the lens 3a in an effort to make the encoder device slimmer.

It should be noted that although in FIG. 1 the leaked light appears to penetrate the main scale 5, in actuality the leaked light is cut off by the main scale 5 (the slanted line sections shown in FIG. 1) once a given slit 4 has passed the position opposite the central portion of the lens 3a, and hence does not strike the light-receiving elements 2A and 2b.

Further, the volume of light is particularly heavy around a central axis and surrounding area of the lens 3a, and as a result the effect of leaked light tends to be more pronounced thereabout. Thus light-receiving elements 2A and 2b are particularly susceptible to the effects of leaked light because they are positioned closer to the central portion of the lens 3a than light-receiving elements 2B and 2a.

As a result, the accuracy and reliability of the phase A signal and the phase b signal output from the light-receiving elements 2A and 2b declines.

SUMMARY OF THE INVENTION

Accordingly, it is an object of the present invention to provide an improved and useful encoder device in which the above-mentioned disadvantages are eliminated.

The above-described object of the present invention is achieved by an encoder device comprising:

a main scale with slit-like openings at regular intervals;

light-emitting means for emitting and directing light toward the main scale;

light-receiving means including four light receiving members for receiving light emitted from the light-emitting means via the slit-like openings in the main scale; and means for obtaining information concerning displacement of the main scale by using output signals output from the light-receiving means, the first light-receiving member and the second light-receiving member disposed with respect to the slit-like openings of the main scale so as to have substantially the same phase, the third light-receiving member and the fourth light-receiving member disposed with respect to the slit-like openings of the main scale so that a first differential output signal, obtained by differentially amplifying an output signal output from the first light-receiving member and an output signal output from the third light-receiving member, and a second differential output signal, obtained by differentially amplifying an output signal output from the second light-receiving member and an output signal output from the fourth light-receiving member, have the same period, and further, the first differential output signal and the second differential output signal have a predetermined phase difference.

According to the invention described above, the effect of light leaking from the openings in the main scale in the area of the central axis of the light-emitting means can be eliminated and the distance separating the lens and the light-receiving members can be reduced. As a result, the encoder device can be made slimmer.

Additionally, the above-described object of the present invention is also achieved by the encoder device as described above, wherein the output signal output from the third light-receiving member has a first phase difference with respect to the output signal output from the first light-receiving member, and the output signal output from the fourth light-receiving member has a second phase difference with respect to the output signal output from the second light-receiving member.

According to the invention described above, the first, second, third and fourth light-receiving members can be positioned so that the first differential output signal and the second differential output signal have a predetermined phase difference.

Additionally, the above-described object of the present invention is also achieved by the encoder device described above, wherein the light-emitting means has a lens for emitting light in substantially parallel beams, a central axis of the lens being positioned along a line midway between the first light-receiving member and the second light-receiving member.

According to the invention described above, the first light-receiving member and the second light-receiving member can be positioned so as to have substantially the same phase with respect to the openings of the main scale.

Additionally, the above-described object of the present invention is also achieved by the encoder device described above, wherein the first phase difference is approximately 135 degrees and the second phase difference is approximately 45 degrees.

According to the invention described above, a first differential output signal and a second differential output signal having a phase difference of 90 degrees can be output.

Additionally, the above-described object of the present invention is also achieved by the encoder device described above, wherein a solid shield portion of the main scale has a width identical to a width of the slit-like openings of the main scale.

According to the invention described above, the light emitted from the light-emitting means can be received at the light-receiving members in such a way as to reflect accurately the relative displacement between the main scale and each of the light-receiving members.

Additionally, the above-described object of the present invention is also achieved by the encoder device described above, wherein the four light-receiving members are disposed substantially in an arc so as to surround the central axis of the lens of the light-emitting means.

According to the invention described above, each of the light-receiving members can be positioned near the spot of light emitted from the light-emitting means and an appropriate signal level output from the light-receiving members can be maintained.

Additionally, the above-described object of the present invention is also achieved by the encoder device described above, wherein the predetermined phase difference is 90 degrees.

According to the invention described above, the phase difference of both signals is easy to detect and positional detection accuracy can be maintained.

Other objects, features and advantages of the present invention will become more apparent from the following detailed description when read in conjunction with the accompanying drawings.

DESCRIPTION OF THE PREFERRED EMBODIMENTS

A detailed description will now be given of a first embodiment of a disk device according to the present invention, with reference to the accompanying drawings.

Figure 3:
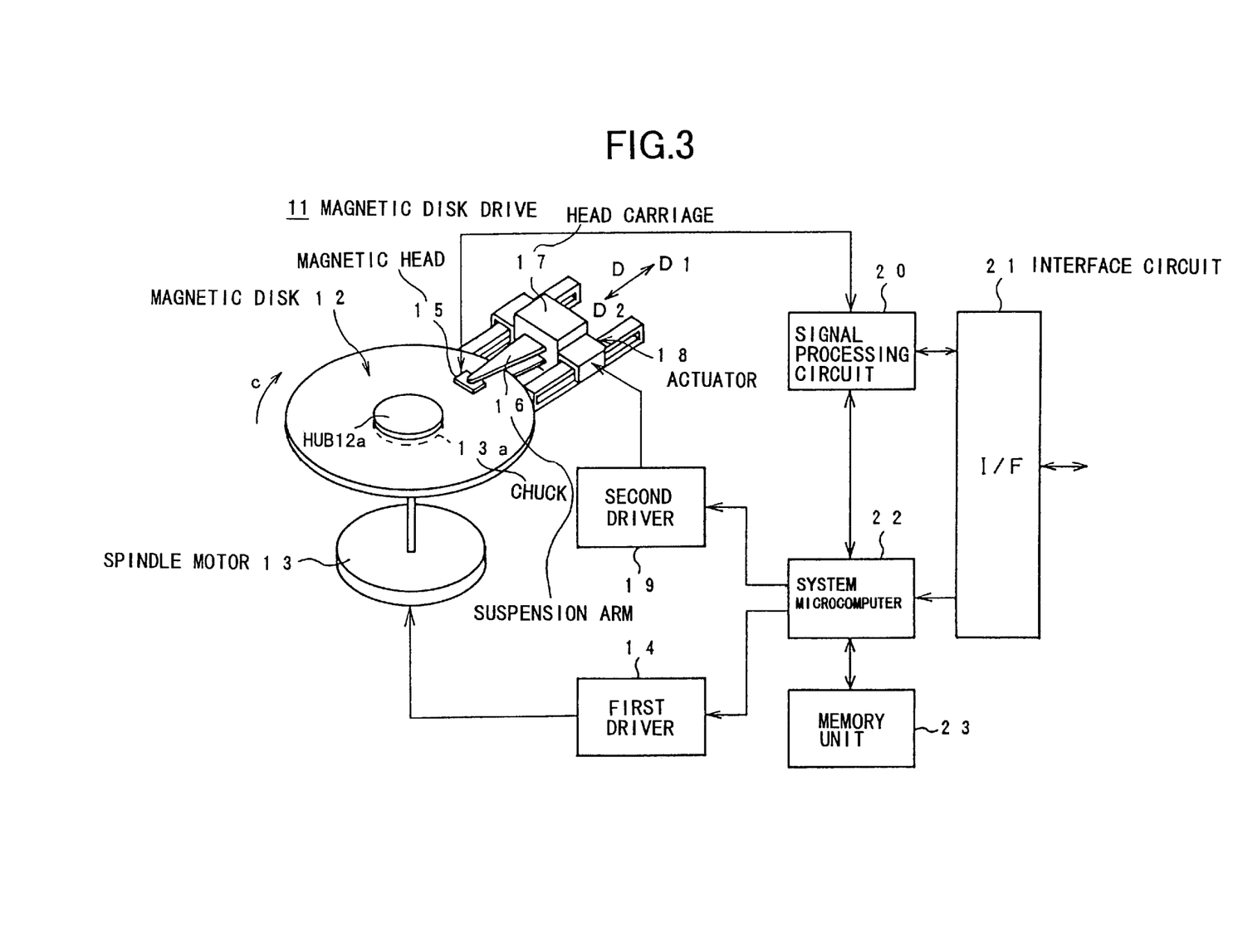
FIG. 3 is a structural diagram of a magnetic disk drive employing an embodiment of an encoder device according to the present invention.

FIG. 3 is a structural diagram of a magnetic disk drive employing an embodiment of an encoder device according to the present invention.

As shown in FIG. 3, a magnetic disk 12 which is the recording medium is loaded into the magnetic disk drive 11. The magnetic disk 12 may for example be a high-density floppy disk. When loaded in the magnetic disk drive 11, a hub 12a of the magnetic disk 12 engages a chuck 13a provided on a rotor of a spindle motor 13.

The spindle motor 13 rotates in response to a rotational drive signal from a driver 14. The rotation of the spindle motor 13 in the direction of arrow C shown in FIG. 3 rotates the magnetic disk 12 in the direction of arrow C.

Additionally, a magnetic head 15 is disposed opposite a recording surface of the magnetic disk 12. The magnetic head 15 is mounted at a tip of a suspension arm 16.

The other end of the suspension arm 16 is mounted on the head carriage 17. As the head carriage 17 moves in a direction of a radius of the magnetic disk 12 the magnetic head 15 mounted on the tip of the head carriage 17 is movably supported so as to move parallel to a surface of the magnetic disk 12.

The head carriage 17 engages an actuator 18. The actuator 18 moves in the direction of the radius of the magnetic disk 12, that is, in the direction of arrow D in FIG. 3, in response to a displacement control signal supplied from a driver 19, thereby moving the head carriage 17 in the direction of arrow D.

The magnetic head is connected to a signal processing circuit 20. This signal processing circuit 20 supplies a recording signal to the magnetic head and also demodulates a reproduction signal reproduced at the magnetic head 15.

The signal processing circuit 20 is connected to an interface circuit 21 and to a system microcomputer 22. The interface circuit 21 is connected between the signal processing circuit 20 and a host computer not shown in the diagram, and acts as the interface between the signal processing circuit 20 and the host computer.

The system microcomputer 22 is connected to the signal processing circuit 20 and the interface circuit 21, as well as to a memory unit 23. The system microcomputer 22 accesses the memory unit 23 in response to current position information supplied from the signal processing circuit 20 and target position information supplied from the interface circuit 21, and controls the speed of displacement of the carriage head 17 according to a plurality of speed profiles stored in the memory unit 23. Additionally, the system microcomputer 22 repositions the head carriage 17 according to a tracking error signal supplied from the signal processing circuit 20.

It should be noted that a speed control operation mode for controlling speed of displacement as well as a position control mode for performing repositioning are provided in the system microcomputer 22. The speed control operation mode is selected when controlling the speed of displacement of the head carriage 17 and the position control mode is selected when repositioning the head carriage 17.

Figure 4:
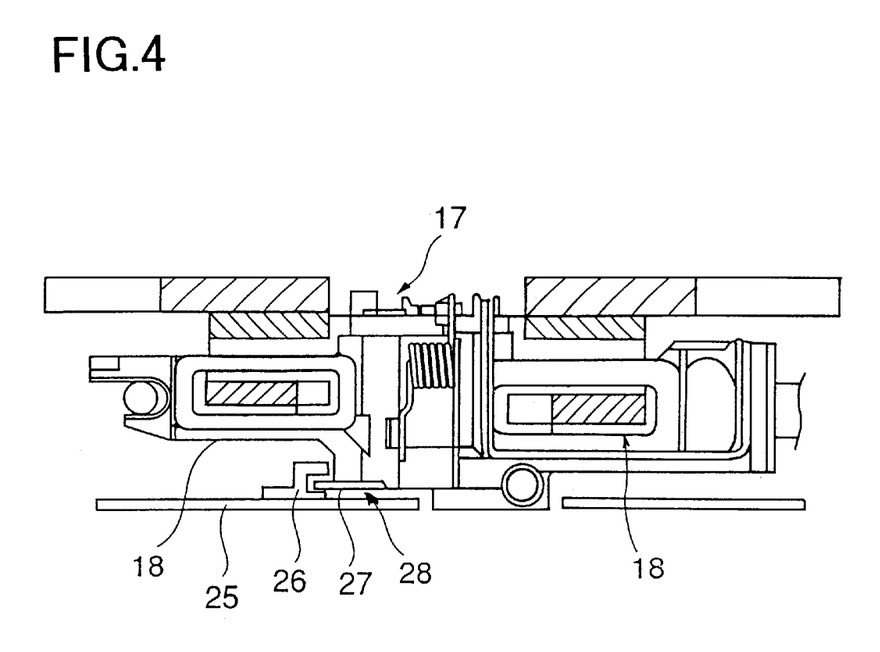
FIG. 4 is a front view of an installed state of an encoder device for detecting the position of a head carriage.
Figure 5A:
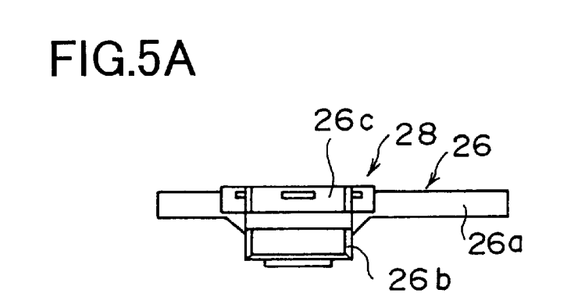
FIGS. 5A, 5B, 5C and 5D are front, plan, side and partial expanded views, respectively, of the encoder device according to the present invention.
Figure 5B:
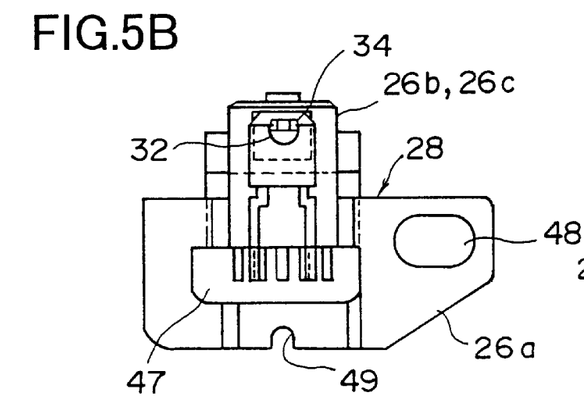
Figure 5C:
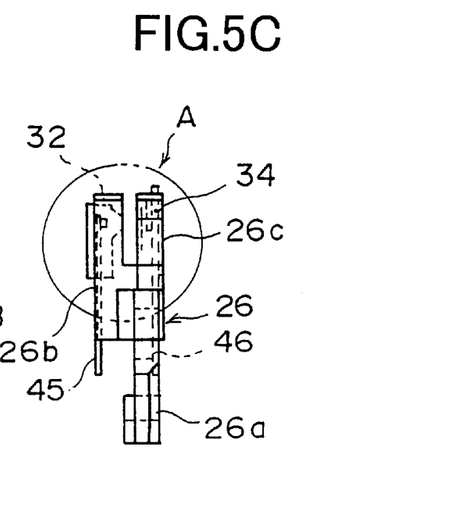
Figure 5D:
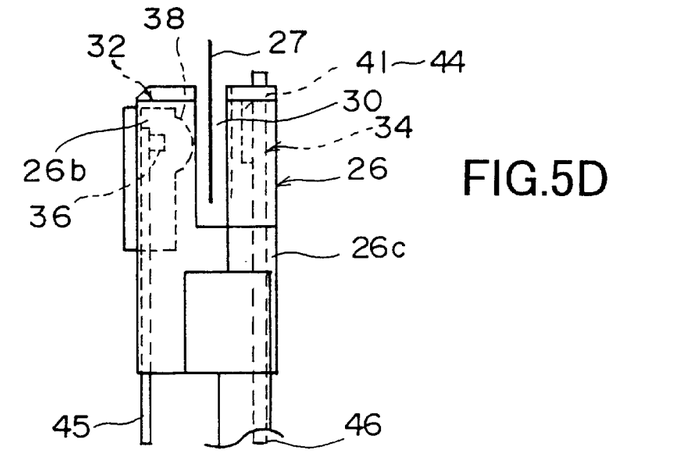

FIG. 4 is a front view of an installed state of an encoder device for detecting the position of a head carriage. As shown in the diagram, a photo-interruptor 26 is vertically mounted on a baseboard 25 so as to oppose a bottom portion of the head carriage 17. A main scale 27 extending in a direction of displacement of the head carriage 17 is mounted on the bottom portion of the head carriage 17. As will be described later, the main scale 27 has openings spaced at regular intervals and is inserted within a slot of the photo-interruptor 26.

The above-described photo-interruptor 26 and the main scale 27 together form an encoder device 28. Accordingly, as the head carriage 17 moves in the direction of the radius of the magnetic disk 12, the main scale 27 moves within the slot of the photo-interruptor 26 and a signal is obtained from the photo-interruptor 26 corresponding to the displacement position of the head carriage 17.

A description will now be given of the encoder device 28.

FIGS. 5A, 5B, 5C and 5D are front, plan, side and partial expanded views, respectively, of the encoder device according to the present invention. As shown in the diagrams, the encoder device 28 comprises the photo-interruptor 26 and the main scale 27, and, as described above, the main scale 27 moves together with the head carriage 17 in the direction of the radius of the magnetic disk 12. The photo-interruptor 26 is made from a single piece of plastic in such a way that a light source 32 and a light sensor portion 34 are disposed opposite each other across a slot 30 into which the main scale 27 is inserted. Further, the photo-interruptor 26 has a base 26a to be mounted on the baseboard 25, a first holding portion 26b supported by the base 26a for supporting the light source 32 and a second holding portion 26c supported by the base 26a for supporting the light-receiving elements.

The light source 32 has a light-emitting element 36 consisting of a directional light-emitting photodiode and a lens 38 for aligning the beams of light emitted from the light-emitting element in parallel beams. Additionally, the light-receiving element consists of four individual light-receiving elements, that is, light-receiving members, 41–44, for receiving light emitted via the lens 38 through the main scale 27. Two terminals 45 extending from the light-emitting element protrude from an edge portion of the first holding member 26b and five terminals extending from the first through fourth light-receiving elements protrude from an edge portion of the second holding portion 26c.

The base 26a has holes 47 through which each of the terminals of the four light-receiving elements 41–44 projects, an elongated hole 48 for mounting the base 26a on the baseboard 25 and a convex portion 49 for positioning the base 26a on the baseboard 25 when mounting the former on the latter.

Figure 6:
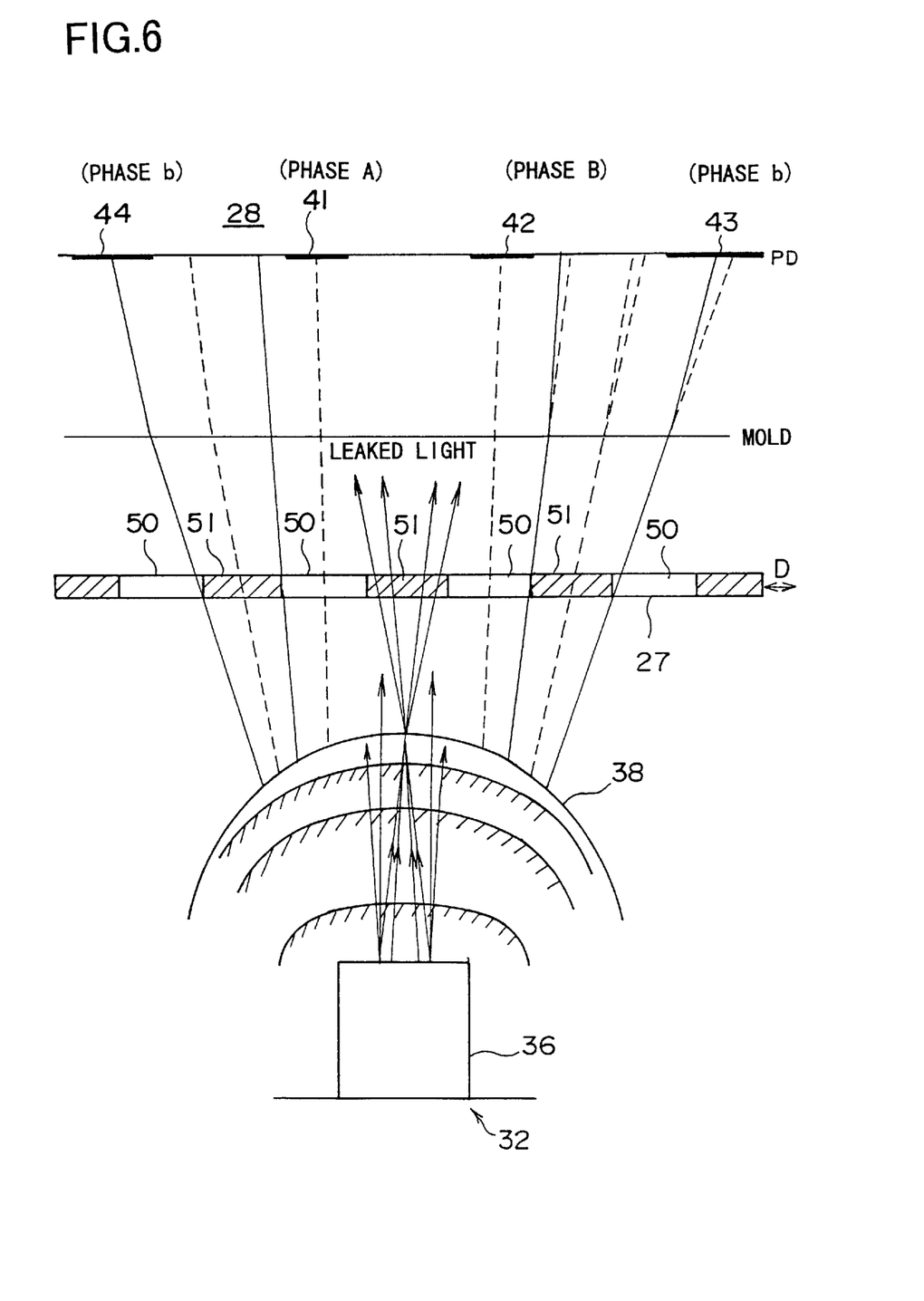
FIG. 6 is a plan view of the relative positions of the main scale, light source and light-receiving elements.

FIG. 6 is a plan view of the relative positions of the main scale, light source and light-receiving elements. As shown in FIG. 6 the main scale 27 is inserted between the lens 38 of the light source 32 and the four light-receiving elements 41–44. The main scale 27 is constructed so that, in a longer direction of the main scale 27, that is, in the direction of displacement of the main scale 27, openings 50 which allow light emitted from the light source 32 alternate with solid shield portions 51 which block the light emitted from the light source 32.

Additionally, the openings 50 have a width in the longer direction, that is, the direction of displacement of the main scale 27, that is identical to the width of the shield portions 51 in the longer direction, that is, the direction of displacement of the main scale 27.

Of the four light-receiving elements 41–44, the first and second light-receiving elements 41 and 42, which are positioned near a central axis of the lens 38 of the light source 32, receive the phase A and phase B light and are positioned so as to receive light at the same phase. Additionally, these first and second light-receiving elements 41 and 42 are placed at a distance from the central axis of the lens 38 of the light source 32 adequate to escape the effects of leaked light generated when the openings 50 move.

Additionally, of the four light-receiving elements 41–44, the third and fourth light-receiving elements 43 and 44 receive the phase a and phase b light, that is, the inverted phase A and inverted phase B light, and are respectively positioned so as to have a first phase difference and a second phase difference of 45 degrees and 135 degrees, respectively, with respect to the first and second light-receiving elements 41 and 42, respectively.

Light emitted from the light-emitting element 36 is directed toward each of the light-receiving elements 41–44 by the lens 38 as beams of light, some portion of which passes through the openings in the main scale 27 and is received by the light-receiving elements 41–44. As a result, the light-receiving elements 41–44 output signals corresponding to changes in the amount of light passing through the openings 50 attendant upon the displacement of the main scale 27 as detected values.

Figure 7:
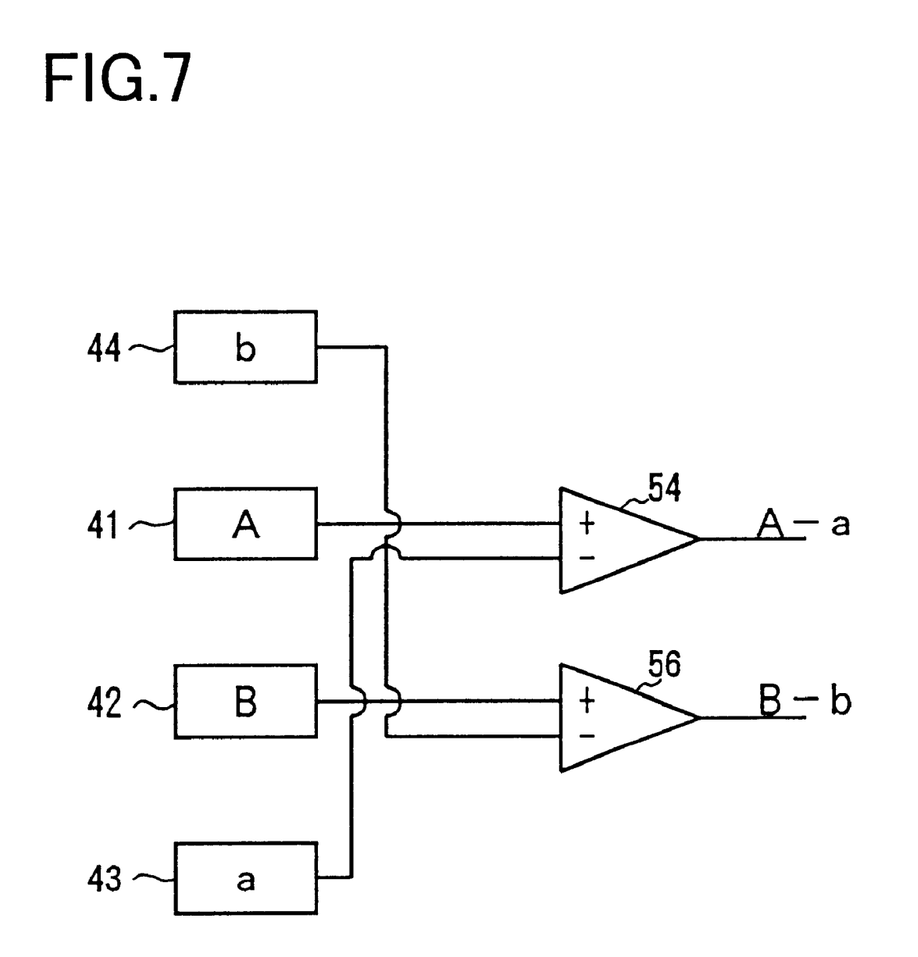
FIG. 7 is a block diagram showing a connection between each of the light-receiving elements and the differential amplifier.

FIG. 7 is a block diagram showing a connection between each of the light-receiving elements 41–44 and a differential amplifier. As shown in the diagram, the first light-receiving element 41 is connected to the non-inverted input terminal (+) of the first differential amplifier 54 and the third light-receiving element 43 is connected to the inverted input terminal (−) of the first differential amplifier 54. As a result, the first differential amplifier 54 outputs a difference A−a between the output signal output from the phase A light-receiving element 41 and the output signal output from the phase a light-receiving element 43.

Additionally, the second light-receiving element 42 is connected to the non-inverted input terminal (+) of the second differential amplifier 56 and the fourth light-receiving element 44 is connected to the inverted input terminal (−) of the second differential amplifier 56. As a result, the second differential amplifier 56 outputs a difference B−b between the output signal output from the phase B light-receiving element 42 and the output signal output from the phase b light-receiving element 44.

Figure 8:
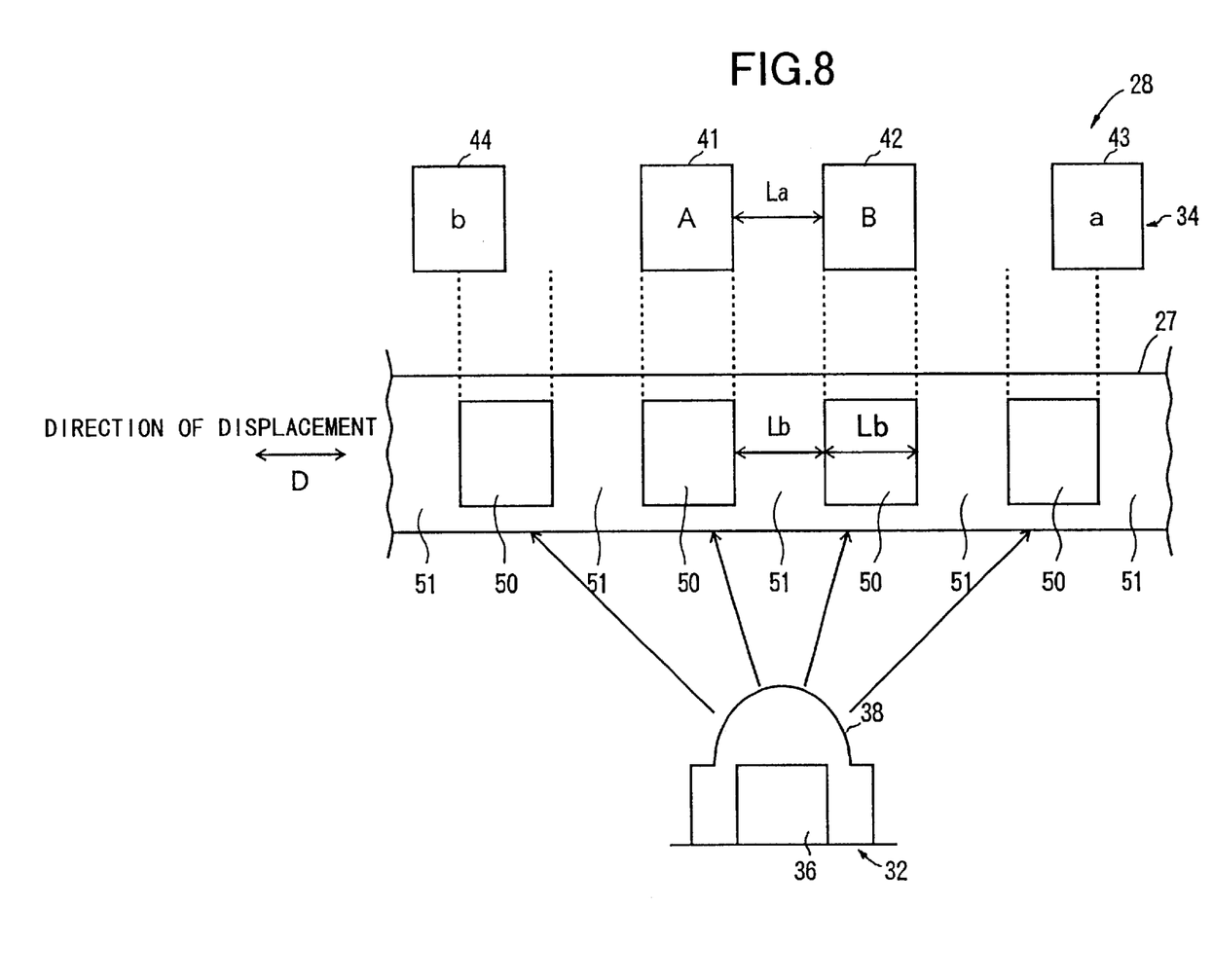
FIG. 8 is a schematized view of the relative positions between the light source, light-receiving elements and main scale openings.

FIG. 8 is a schematized view of the relative positions of the light source 32, light-receiving elements 41–44 and openings 50 in the main scale 27. As shown in the diagram, the individual light-receiving elements 41–44 are positioned with respect to the openings 50 in the main scale 27 so that the first light-receiving element 41 and the second light-receiving element 42 squarely oppose openings 50 in the main scale 27, whereas the third light-receiving element 43 opposes a rear half of an opening 50 and the fourth light-receiving element 44 opposes a front half of an opening 50.

Accordingly, it is possible to make a distance La separating the first light-receiving element 41 and the second light-receiving element 42 in the direction of displacement D of the main scale 27, which hitherto in the conventional art has been equal to a width Lb of the openings 50 in the direction of displacement D of the main scale 27, larger than such distance Lb. The intensity of the light is strong in the area near the central axis of the lens 38 of the light source 32, so the first and second light-receiving elements 41 and 42, which are positioned closer to the light source 32 than the third and fourth light-receiving elements 43 and 44, are susceptible to the effects of leaked light. However, in the present embodiment it is possible to make the distance La separating the first light-receiving element 41 and the second light-receiving element 42 in the direction of displacement D of the main scale 27 larger than hitherto in the conventional art, so the effects of light leaked when a given opening 50 is between the first light-receiving element 41 and the second light-receiving element 42 can be eliminated and it is possible to shorten the distance between the light source 32 and the light sensor portion 34 and hence make the encoder device 28 slimmer.

The lens 38 of the light source 32 aligns the light emitted from the light-emitting element 36 in parallel beams and directs it toward the openings 50 in the main scale 27. Additionally, the central axis of the lens 38 is disposed so as to be positioned astride a line midway between the first light-receiving element 41 and the second light-receiving element 42. As a result, the first light-receiving element 41 and the second light-receiving element 42 are positioned with respect to the openings 50 in the main scale 27 so as to have substantially the same phase.

As the main scale 27 is displaced in the direction D, the surface area of the openings 50 of the main scale 27 opposite the individual light-receiving elements 41–44 gradually increases and the amount of light received at the light-receiving elements 41–44 also increases. When the openings are squarely opposite the light-receiving elements 41–44 the amount of light received at the light-receiving elements 41–44 is 100 percent. Thereafter the surface area of the openings 50 of the main scale 27 opposite the individual light-receiving elements 41–44 gradually decreases and the amount of light received at the light-receiving elements 41–44 also decreases. As a result, the output of the individual light-receiving elements 41–44 becomes signals corresponding to changes in the amount of light passing through the openings 50 of the main scale 27 and received at the light-receiving elements 41–44.

By positioning the first light-receiving element 41 and the second light-receiving element 42 with respect to the openings 50 in the main scale 27 so as to have substantially the same phase and distancing the first and second light-receiving elements 41 and 42 from the central axis area of the lens 38, the effects of leaked can be eliminated, the light-receiving elements 41–44 can be positioned closer to the lens 38 and it is possible to make the encoder device 28 slimmer.

Additionally, the third light-receiving element 43 is positioned so that the output signal a of the third light-receiving element 43 has a phase that is 45 degrees different from the output signal A of the first light-receiving element 41, and the fourth light-receiving element 44 is positioned so that the output signal b of the fourth light-receiving element 44 has a phase that is 135 degrees different from the output signal B of the second light-receiving element 42, so the first differential output signal A−a and the second differential output signal B−b have a phase difference of 90 degrees.

Figure 9A:
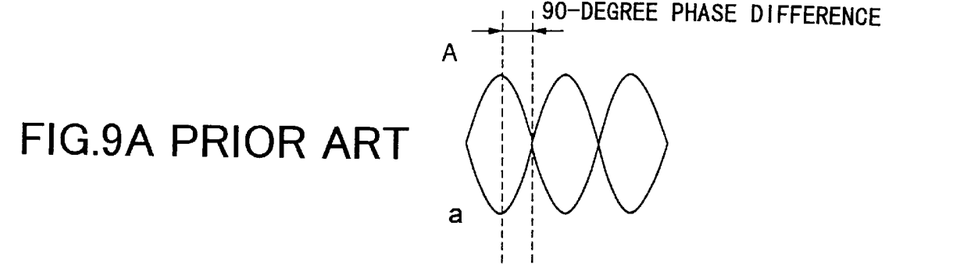
FIGS. 9A and 9B are diagrams of waveforms obtained with the conventional encoder device.
Figure 9B:
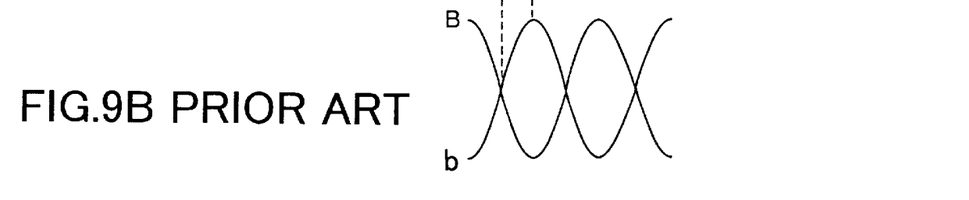

FIGS. 9A and 9B are diagrams of waveforms obtained with the conventional encoder device. As shown in the diagrams, with the conventional encoder device, the four light-receiving elements are arranged so that phase A and phase B have a phase difference of 90 degrees and inverted phase A and inverted phase B have a phase difference of 90 degrees, with phase A and inverted phase A having a phase difference of 180 degrees and phase B and inverted phase B having a phase difference of 180 degrees.

As a result, in the conventional encoder device no differentially amplified signal is obtained from between phase A and inverted phase A, which are set so as to have a phase difference of 180 degrees. Similarly, no differentially amplified signal is obtained from between phase B and inverted phase B, which are set so as to have a phase difference of 180 degrees. Instead, the only signals obtained are the phase difference signal between phase A and phase B and the phase difference signal between inverted phase A and the inverted phase B.

Figures 10A, 10B:
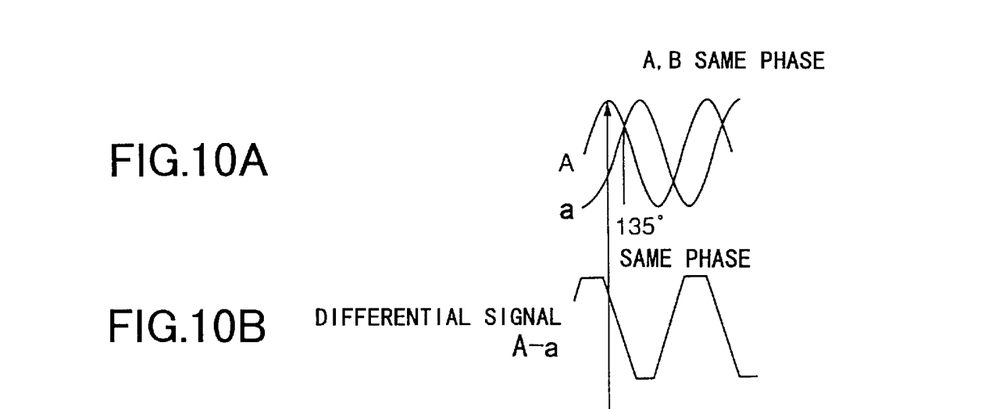
FIGS. 10A, 10B, 10C and 10D are diagrams of waveforms obtained with the encoder device according to the present invention.

FIGS. 10A, 10B, 10C and 10D are diagrams of waveforms obtained with the encoder device according to the present invention. As shown in FIG. 10A, in the present embodiment, phase A and inverted phase A, that is, phase a, have a phase difference of 135 degrees, so the first differential output signal A–a output from the first differential amplifier 54 is a trapezoidal wave that approximates a sine wave as shown in FIG. 10B.

Figure 10C:
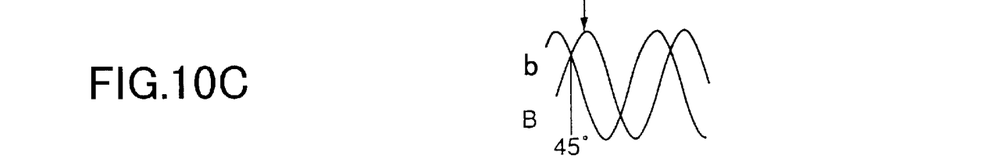
Figure 10D:
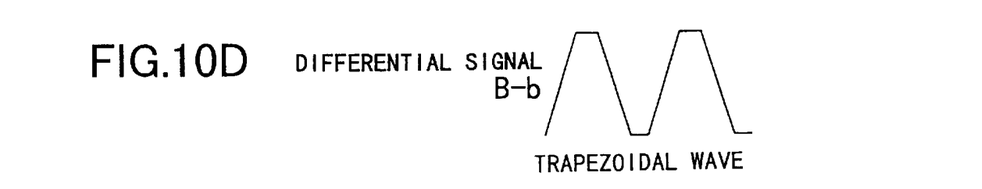

Additionally, as shown in FIG. 10C, in the present embodiment, phase B and inverted phase B, that is, phase b, have a phase difference of 45 degrees, so the second differential output signal B–b output from the second differential amplifier 56 is a trapezoidal wave that approximates a sine wave as shown in FIG. 10D.

Accordingly, with respect to the openings 50 in the main scale 27, the third light-receiving element 43 and the fourth light-receiving element 44 are positioned so that the first differential output signal A–a, which is obtained by differential amplification of the output signal output from the first light-receiving element 41 and the third light-receiving element 43, and the second differential output signal B–b, which is obtained by differential amplification of the output signal output from the second light-receiving element 41 and the fourth light-receiving element 43, have the same period, and further, that the first differential output signal A–a and the second differential output signal B–b have a phase difference of 90 degrees.

According to the above, the direction of displacement of the head carriage 17 on which is mounted the main scale 27 can be determined from the phase difference between the first differential output signal A–a and the second differential output signal B–b. Additionally, the speed of displacement can be obtained from the period of the individual signals, while the displacement position can be obtained from the number of pulses of the individual signals.

Figure 11:
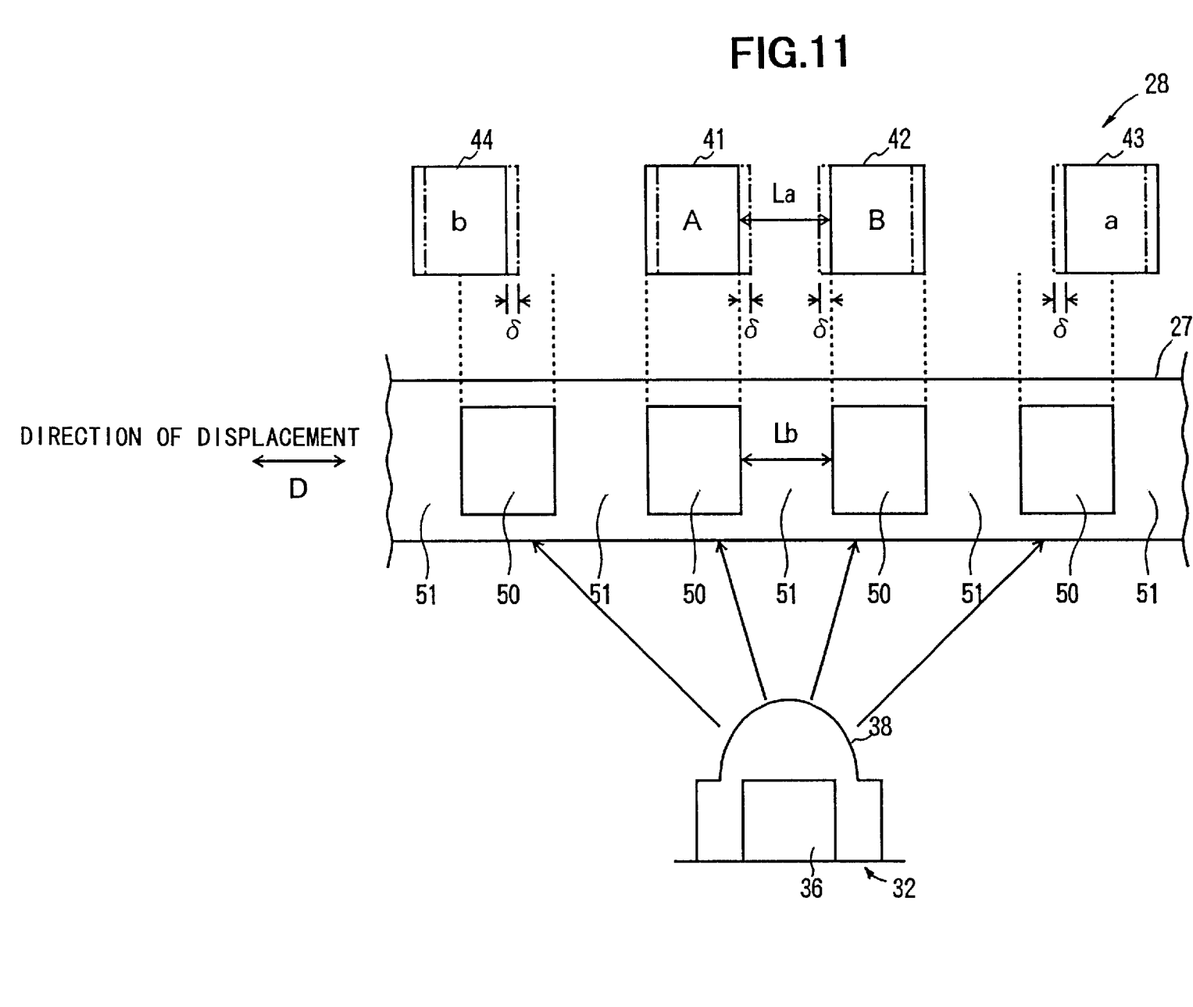
FIG. 11 is a structural diagram of a first variation of the present invention.

FIG. 11 is a structural diagram of a first variation of the present invention. As shown in the diagram, the individual light-receiving elements 41–44 can be positioned nearer each other than in the embodiment described above by a distance δ. That is, provided first light-receiving element 41 and the second light-receiving element 42 remain within an area unaffected by leaked light, the distance La between the first light-receiving element 41 and the second light-receiving element 42 in a direction of. displacement D of the main scale 27 can be narrowed to a distance La–2 δ and still be made larger than the distance separating these two light-receiving elements in the conventional encoder device.

FIGS. 12A, 12B, 12C and 12D are diagrams of waveforms obtained with the encoder device of the first variation.

Figure 12A:
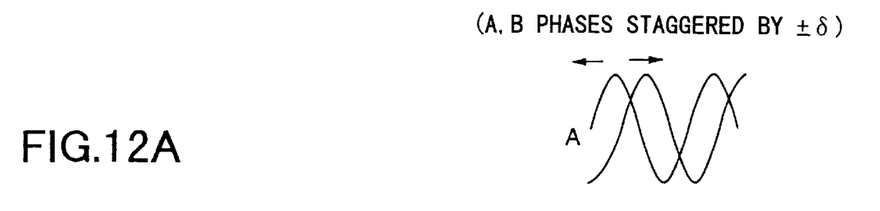
FIGS. 12A, 12B, 12C and 12D are diagrams of waveforms obtained with the encoder device of the first variation.
Figure 12B:
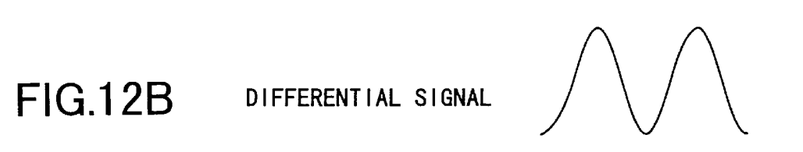

As shown in FIG. 12A, in a case in which the individual light-receiving elements 41–44 have been moved closer to each other by a distance δ, the phase difference between phase A and inverted phase A, that is, phase a, becomes slightly larger than 135 degrees, so the first differential output signal A–a output from the first differential amplifier 54 assumes substantially the form of a sine wave.

Figure 12C:
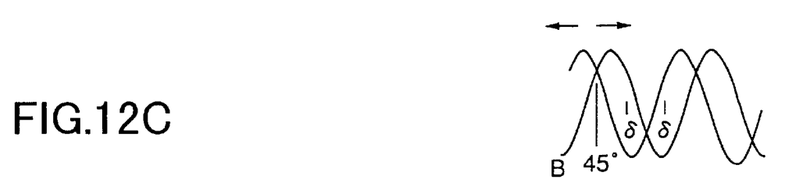
Figure 12D:
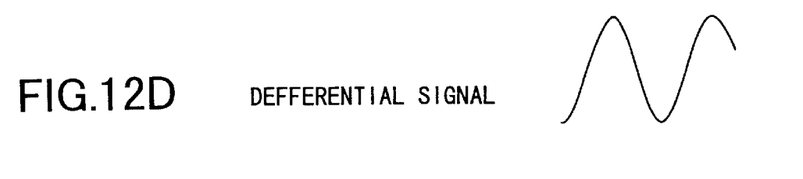

Additionally, as shown in FIG. 12C, in the present embodiment, the phase difference between phase B and inverted phase B, that is, phase b, becomes slightly larger than 45 degrees, so the second differential output signal B–b output from the second differential amplifier 56 assumes substantially the form of a sine wave.

Figure 13:
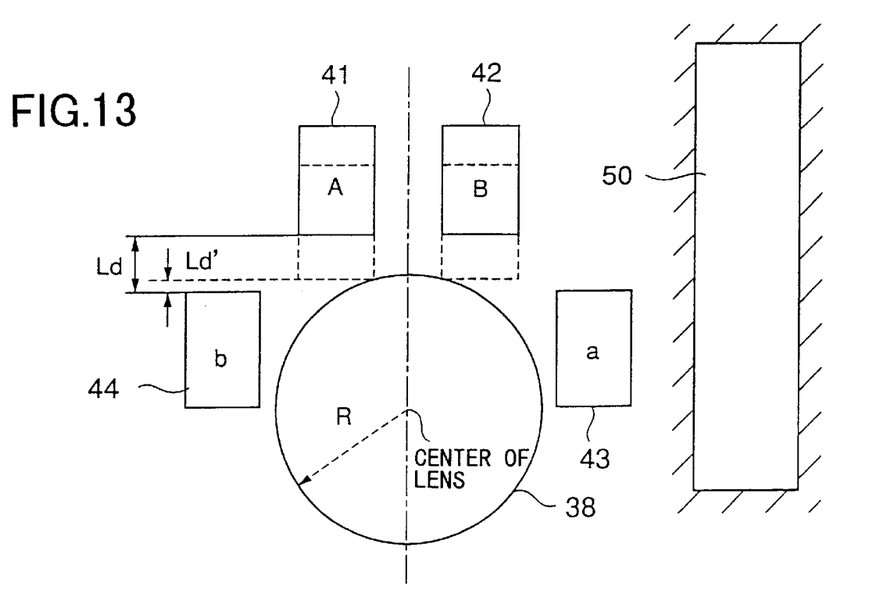
FIG. 13 is a structural diagram of a second variation of the present invention.

FIG. 13 is a structural diagram of a second variation of the present invention. As shown in the diagram, the individual light-receiving elements 41–44 are positioned around a diameter of the lens 38 of the light source 32. Specifically, the first and second light-receiving elements 41 and 42 are disposed above an outer periphery of the lens 38 and the third and fourth light-receiving elements 43 and 44 are disposed to the sides of the outer periphery of the lens 38. Accordingly, light-receiving elements 41 and 42, and light-receiving elements 43 and 44 are offset with respect to one another by a distance Light detector.

Additionally, a vertical dimension of the openings 50 in the main scale 27 has been increased so as to oppose the individual light-receiving elements 41–44.

Accordingly, the same effects and advantages as with the embodiments previously described embodiments can be obtained and, at the same time, the amount of light received at the individual light-receiving elements 41–44 can be made substantially identical and the output level of the signals output from the individual light-receiving elements 41–44 can be made substantially identical as well.

It should be noted that although the above-described embodiments and variations consistently described an encoder device 28 employed in a magnetic disk drive 11, the encoder device 28 of the present invention is not limited to such applications but is applicable to the detection of a displacement of a movable member of other devices as well.

The above description is provided in order to enable any person skilled in the art to make and use the invention and sets forth the best mode contemplated by the inventor of carrying out the invention.

The present invention is not limited to the specifically disclosed embodiments, and variations and modifications may be made without departing from the scope of the present invention.

The present application is based on Japanese Priority Application No. 11-0055754 filed on Jan. 12, 1999, the entire contents of which are hereby incorporated by reference.

What is claimed is:

1. An encoder device comprising:
a main scale with a plurality of slit-like openings at regular intervals;
light-emitting means for emitting and directing light toward the main scale;
light-receiving means including four light receiving members for receiving light emitted from the light-emitting means via the slit-like openings in the main scale; and
means for obtaining information concerning displacement of the main scale by using output signals output from the light-receiving means,
the first light-receiving member and the second light-receiving member disposed with respect to the slit-like openings of the main scale so as to have substantially the same phase, the third light-receiving member and the fourth light-receiving member disposed with respect to the slit-like openings of the main scale so that a first differential output signal, obtained by differentially amplifying an output signal output from the first light-receiving member and an output signal output from the third light-receiving member, and a second differential output signal, obtained by differentially amplifying an output signal output from the second light-receiving member and an output signal output from the fourth light receiving member, have the same period, and further, the first differential output signal and the second differential output signal have a predetermined phase difference wherein the light-emitting means has a lens for emitting light in substantially parallel beams, a central axis of the lens being positioned along a line midway between the first light-receiving member and the second light-receiving member.

2. The encoder device as claimed in claim 1, wherein the output signal output from the third light-receiving member has a first phase difference with respect to the output signal output from the first light-receiving member, and the output signal output from the fourth light-receiving member has a second phase difference with respect to the output signal output from the second light-receiving member.

3. The encoder device as claimed in claim 2, wherein the first phase difference is approximately 135 degrees and the second phase difference is approximately 45 degrees.

4. The encoder device as claimed in claim 1, wherein a solid shield portion of the main scale has a width identical to a width of the slit-like openings of the main scale.

5. The encoder device as claimed in claim 1, wherein the four light-receiving members are disposed substantially in an arc so as to surround the central axis of the lens of the light-emitting means.

6. The encoder device as claimed in claim 1, wherein the predetermined phase difference is 90 degrees.

* * * * *